United States Patent Office 3,636,007
Patented Jan. 18, 1972

3,636,007
OXYGEN COMPLEXES OF RING SUBSTITUTED N,N' - ETHYLENEBIS(SALICYLIDENEIMINATO) COBALT (II)
Fausto Calderazzo, Via Fiorentina 12, 51017 Pescia, Pistoia Italy, and Carlo Floriani, Via Prinetti 19, 56100 Pisa, Italy
No Drawing. Continuation-in-part of application Ser. No. 635,380, May 2, 1967. This application Mar. 13, 1969, Ser. No. 807,117
Int. Cl. C07f *15/06*
U.S. Cl. 260—270 R
8 Claims

ABSTRACT OF THE DISCLOSURE

Oxygen complexes of N,N'-ethylenebis(salicylideneiminato) cobalt (II)

CoSaEn

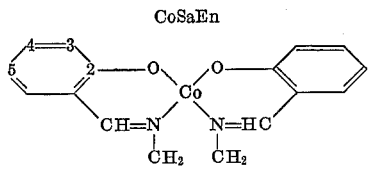

and of substitution products having substituents such as halogen, alkoxy, or the like on a carbocyclic ring thereof are produced by a complexing reaction of such compound with oxygen and an organic ligand. The reaction medium is an organic liquid which comprises an aprotic organic solvent that will complex as a ligand with the cobalt compound. The complex products have two gram atoms oxygen and one or two moles of the organic ligand complexed per two moles of the CoSaEn moiety. The complexes are prepared by dispersing or dissolving the CoSaEn compound in an organic liquid which comprises the ligand and then exposing the mixture to oxygen. Suitable aprotic solvent ligands include dimethylformamide, dimethylsulfoxide, pyridine oxide and the like. Pyridine similarly complexes making a complex having one mole pyridine, one mole CoSaEn and two gram atoms oxygen.

This application is a continuation-in-part of our earlier application Ser. No. 635,380, filed May 2, 1967, and now abandoned.

BACKGROUND OF THE INVENTION

CoSaEn (N,N' - ethylenebis - (salicylideneiminato) cobalt (II)) has been reacted in the past with oxygen in the solid state, but the reaction is relatively slow. Also, preactivation of the starting chelate is normally necessary and diffusion of oxygen through the solid is both slow and gives unreliable completeness of reaction unless excessive time is used. Attempts have been made to oxygenate CoSaEn in protic solvents and also such solvents as tetrahydrofuran, acetone and the like, and in liquid ammonia. The oxidation is not complete and very slow. When certain oxidizing solvents, such as nitromethane, are used, the cobalt itself in the complex is oxidized to the trivalent stage. No oxidation is noted when liquid ammonia is used as a reaction medium.

SUMMARY OF THE INVENTION

We have found that rapid and substantially quantitative reaction with oxygen takes place at moderate to low temperatures. When the solvent is substantially inert, such as aromatic hydrocarbons, for example toluene, dimethylacetamide, chloroform, acetone, tetrahydrofuran, 2,2'-dimethoxydiethylether and the like are used, there is no formation of the oxygen complexes. With certain solvents which are aprotic, such as for example dimethylformamide, dimethylsulfoxide, and pyridine oxide, they also enter into the coordination sphere of the complex, acting as ligands. The resulting oxygen complexes have the following formula, in which Sv is used generically as designating the solvent which can also act as a ligand:

$$2CoSaEn + O_2 + 2Sv \rightarrow (CoSaEn)_2O_2 \cdot 2Sv$$

It should be noted that when a solvent, such as for example dimethylformamide or dimethylsulfoxide, is both a good solvent and acts as a ligand, it may be the only liquid constituent of the reaction medium. In this connection, the term "solvent" is used in a little broader sense than ordinarily, as when the amount drops below a certain rather large excess the CoSaEn is not dissolved entirely into the form of a clear molecular solution and some of it may be present as a very fine suspension. Accordingly, the liquid or liquids will be referred to more generally in the claims as dispersants because they produce a fine dispersion of the CoSaEn or its derivatives. The dispersion may be a pure solution where there is sufficient of the dispersing liquid or a fine suspension of some of the CoSaEn. The reaction medium, therefore, in all cases can be accurately defined by the generic term "fine dispersion."

It is possible to use pyridine as a solvent but only to produce a complex which has a single molecule of solvent for each cobalt atom and for the molecule of oxygen instead of the two CoSaEn for each molecule of oxygen.

In addition to CoSaEn itself, substituted CoSaEn also produces oxygen complexes in solution for example halogen substituted CoSaEn, of which 5-chloro CoSaEn is typical, or an alkoxy substituted CoSaEn, of which 3-methoxy CoSaEn is a typical example. Even with the preferred solvent for example DMSO, alkoxy CoSaEn produced complexes having one equivalent of the solvent for two alkoxy CoSaEn's. It is not known why the complexes are different with alkoxy CoSaEn than with CoSaEn itself or the other derivatives referred to above, and the invention is not limited to any theory of why these unexpected differences of result occurred. In order to make writing of the formulae clearer, the following abreviations will be used throughout the specification, DMF—dimethylformamide
DMSO—dimethylsulfoxide
PyO—pyridine oxide
Py—pyridine From a process standpoint is should be noted that the conditions can vary quite widely. Thus the temperature can be from room temperature or somewhat lower, such as 10° C. to 15° C., and, as has been pointed out above, the amount of dispersant is not critical. Enough liquid, however, must be present so that the dispersion is readily stirrable and the CoSaEn or substituted CoSaEn molecules are very finely dispersed. When the amount of liquid is greater, the reaction medium is in the form of a solution and this is preferable in many cases. There is no upper limit on the amount of dispersant except the practical one that if excessive amounts are used the output per unit of equipment drops. In general, amounts of dispersants which produce less than a 1% dispersion are not preferred as there is no advantage over more concentrated dispersions, for example several percents.

The oxygen and solvent complexes of the present invention are, in general, dark colored solids, usually black. The oxygen complexes of unsubstituted CoSaEn with DMF, DMSO and PyO react with a number of halogenated aliphatic compounds, such as chloroform and dichloromethane, according to the following equation:

$$(CoSaEn)_2O_2 \cdot 2Sv \rightarrow 2CoSaEn + O_2 + 2Sv$$

The reaction occurs quantitatively at room temperature and can be used advantageously to determine the combined molecular oxygen contained in those oxygen complexes. The complexes are useful for initiators of free radical polymerization, as catalysts for the decomposition of hydrogen peroxide, and as starting materials for the preparation of other CoSaEn complexes. This reactivity may probably be due to the fact that the oxygen is somewhat loosely bonded to the cobalt and can be removed by heat or a number of chemical reagents, thus leaving a free coordination position on the cobalt. The present invention is not directed to further complexes which can be made from the oxygen-solvent complexes which form the subject matter of the present invention. The invention, however, does include processes of making new complexes.

DESCRIPTION OF THE PREFERRED EMBODIMENTS

The invention will be described in greater detail in conjunction with the following specific examples, which are typical and in which the parts are by weight unless otherwise specified.

EXAMPLE 1

⅓ gm. CoSaEn is suspended in 40 ml. of DMF to form a fine suspension. Oxygen is then bubbled through, with adequate stirring, and at 12° C. the reaction is substantially complete, 97% theoretical yield, in about 10 minutes.

The resulting complex, which has the formula $(CoSaEn)_2O_2 \cdot 2DMF$, is precipitated as black crystals, filtered and washed with dry ethyl ether, followed by drying in air. That the DMF is a ligand in the complex is shown by the fact that an infrared spectrum of the complex shows a band at 1630 cm.$^{-1}$, which is typical of the amidic CO of the DMF.

The complex, when heated to 100° C., loses oxygen and DMF, regenerating the CoSaEn quantitatively.

EXAMPLE 2

The procedure of Example 1 is repeated, the amount of DMF being increased to the point where a true solution of the CoSaEn results. Reaction occurs with the same speed and the same completeness at about 12° C. The oxygen-DMF complex is recovered by precipitation and washed and dried as described in conjunction with Example 1 as black crystals having the same properties as the product of Example 1.

EXAMPLE 3

The process of Example 1 is repeated, substituting a corresponding amount of DMSO for the DMF. The reaction is substantially quantitative, as is the case with DMF, and a complex is produced having the formula $(CoSaEn)_2O_2 \cdot 2DMSO$. The product, as black crystals, is recovered in the same manner as described in the foregoing examples.

EXAMPLE 4

10.2 mmoles CoSaEn were suspended in 50 ml. of dimethylacetamide containing 24.2 mmoles of pyridine oxide. Dry oxygen is bubbled through for a day, and the black precipitate which forms was filtered, washed with diethyl either and dried in a stream of air. A 72% yield was obtained of a product which has the formula $(CoSaEn)_2O_2(PyO)_2$. The volume of oxygen absorbed during the reaction was found to correspond to about 93% of the theoretical amount.

EXAMPLE 5

2.18 grams of 5-Cl-CoSaEn was dissolved in 500 ml. of anhydrous DMSO at room temperature under an atmosphere of nitrogen. This solution was then exposed to dry air for two days. A red-brown precipitate separated by filtration, washed with carbon tetrachloride and dried, and represented at 44% yield of the complex $(5\text{-Cl-CoSaEn})_2O_2(DMSO)_2$

EXAMPLE 6

3.62 grams of 3-methoxy CoSaEn was dissolved in 100 ml. of DMSO under nitrogen. This solution was then exposed to air for four days and finally to oxygen for one day. A black precipitate formed, was filtered and dried, and represented a 57% yield of the complex $(3\text{-CH}_3\text{O-CoSaEn})_2O_2(DMSO)$

EXAMPLE 7

2.06 grams of 3-methoxy CoSaEn was dissolved in 200 ml. of anhydrous pyridine under nitrogen, and then the solution exposed to an atmosphere of dry oxygen for one day. A brown-red precipitate formed, which was filtered, washed with heptane and dried in a stream of dry air. A 77% yield was obtained of the complex $3\text{-CH}_3\text{O-CoSaEn} \cdot O_2Py$

We claim:
1. A complex of an N,N'-ethylenebis(salicylideneiminato) cobalt (II) compound and oxygen and an organic ligand, said complex having the formula

$(XCoSaEn)_2O_2 nSv$ wherein
XCoSaEn represents an N,N'-ethylenebis(salicylideneiminato) cobalt (II) moiety or the same having a halogen atom or methoxy radical substituted for one hydrogen atom on each of the carbocyclic rings of such moiety,
Sv represents a ligand selected from the group consisting of dimethylformamide, dimethylsulfoxide and pyridine oxide, and $n$ is one when XCoSaEn is a methoxy substituted moiety and otherwise $n$ is 2.

2. A complex defined by claim 1 wherein XCoSaEn is N,N'-ethylenebis(salicylideneiminato) cobalt (II) and $n$ is 2.

3. A complex defined by claim 1 wherein XCoSaEn is N,N'-ethylenebis(3 - methoxy-salicylideneiminato) cobalt (II) and $n$ is 1.

4. A complex according to claim 1 in which X is hydrogen and Sv is dimethylformamide.

5. A complex according to claim 1 in which X is hydrogen and Sv is dimethylsulfoxide.

6. A complex according to claim 1 in which X is halogen and Sv is dimethylsulfoxide.

7. A complex according to claim 1 in which X is hydrogen and Sv is pyridine oxide.

8. A complex according to claim 3 in which X is methoxy and Sv is dimethylsulfoxide.

References Cited

UNITED STATES PATENTS 2,508,490   5/1950   Calvin et al. _____ 260—439

OTHER REFERENCES

Calderazzo et al.: Inorg. Nucl. Chem. Letters, vol. 2, 1966, pp. 379–81.

Bailes et al.: J. Am. Chem. Soc., 69, 1947, pp. 1886–1893.

Calvin et al. (II): J. Am. Chem. Soc., 68, 1946, pp. 2254–6.

Stewart et al.: Bureau of Mines Information Circular No. 7906, 1959, pp. 1–13, 16–18.

Martell et al.: Chemistry of the Metal Chelates, 1952, Prentice-Hall, Inc., New York, N.Y., pp. 339–341.

Selbin: Chem. Rev., 65, 1965, pp. 155, 166–9.

TOBIAS E. LEVOW, Primary Examiner

A. P. DEMERS, Assistant Examiner

U.S. Cl. X.R.

23—221; 252—431 R, 431 N; 260—429 J, 439 R